United States Patent [19]

White, III et al.

[11] Patent Number: 5,677,359

[45] Date of Patent: Oct. 14, 1997

[54] THREE COMPONENT POLYOL BLEND FOR USE IN INSULATING RIGID POLYURETHANE FOAMS

[75] Inventors: Walter R. White, III, Trenton; James A. Mullins, Wyandotte; Thomas B. Lee, Southgate; Keith McLellan, Trenton; Ronald J. Wierzbicki, Plymouth, all of Mich.

[73] Assignee: BASF Corporation, Mount Olive, N.J.

[21] Appl. No.: 756,650

[22] Filed: Nov. 26, 1996

Related U.S. Application Data

[60] Division of Ser. No. 658,103, Jun. 4, 1996, which is a continuation-in-part of Ser. No. 551,507, Nov. 1, 1995, Pat. No. 5,547,998, Ser. No. 551,658, Nov. 1, 1995, Pat. No. 5,523,334, and Ser. No. 548,362, Nov. 1, 1995, Pat. No. 5,525,641.

[51] Int. Cl.$^6$ .............................. C08J 9/14; C08G 18/32; C08G 18/34
[52] U.S. Cl. ..................... 521/131; 521/167; 521/173; 521/174; 521/902
[58] Field of Search ............................ 521/131, 167, 521/173, 174, 902

[56] References Cited

U.S. PATENT DOCUMENTS 5,391,317  2/1995  Smits .

FOREIGN PATENT DOCUMENTS

WO 94/03515  10/1994  WIPO .

OTHER PUBLICATIONS

"*An Insight into the Characteristics of a Nucleation Catalyst in CFC–Free Rigid Foam Systems*", 35th Annual Polyurethane Technical/Marketing Conference, Oct. 9–12, 1994, by H. Yoshimura, Y. Tamano, S. Okuzono, D. Lowe, pp. 300–310.

*Primary Examiner*—Morton Foelak
*Attorney, Agent, or Firm*—Harness, Dickey & Pierce, P.L.C.

[57] ABSTRACT

There is now provided a polyisocyanate based rigid closed cell foam made by reacting an organic isocyanate with a polyol composition in the presence of a blowing agent, where the polyol composition contains at least:

a) an aromatic amine initiated polyoxyalkylene polyether polyol having an hydroxyl number of 200 meq polyol/g KOH or more;

b) an aliphatic amine initiated polyoxyalkylene polyether polyol having an hydroxyl number of 200 meq polyol/g KOH or more; and c) an aromatic polyester polyol having an hydroxyl number of 200 meq. polyol/g KOH or more.

The blowing agent is selected from the group consisting of cyclopentane, HFC's, HCFC's, and mixtures thereof in an amount of 5.0 weight percent or more based on the weight of the polyol composition. Preferably, the blowing agent is soluble in the polyol composition without sacrificing, and advantageously improving, the thermal insulation and dimensional stability of the resulting polyurethane foam.

Also disclosed are a storage stable polyol composition and methods for making a polyisocyanate based rigid closed cell foam.

13 Claims, No Drawings

THREE COMPONENT POLYOL BLEND FOR USE IN INSULATING RIGID POLYURETHANE FOAMS

This is a division of U.S. patent application Ser. No. 08/658,103, filed Jun. 4, 1996; which is a Continuation-In-Part of U.S. Ser. No. 08/551,507 filed Nov. 1, 1995, which issued as U.S. Pat. No. 5,547,998; a Continuation-In-Part of U.S. Ser. No. 08/551,658 filed Nov. 1, 1995, which issued as U.S. Pat. No. 5,523,334; and a Continuation-In-Part of U.S. Ser. No. 08/548,362 filed Nov. 1, 1995, which issued as U.S. Pat. No. 5,525,641.

FIELD OF THE INVENTION

This invention pertains to rigid closed cell polyurethane foams blown with a variety of blowing agents. More specifically, the invention pertains to using a polyol composition in which a variety of blowing agents are useful, and preferably soluble. The polyol composition is made up of at least an aromatic amine initiated polyoxyalkylene polyether polyol, an aliphatic amine initiated polyoxyalkylene polyether polyol, and an aromatic polyester polyol.

BACKGROUND OF THE INVENTION

Various blowing agents, including hydrocarbons among others, are often only partially soluble, if not completely insoluble, in many polyols used to manufacture rigid polyurethane foams. This is believed to be due to the non-polar hydrophobic characteristic of hydrocarbons. The insolubility or poor shelf life of hydrocarbon-polyol mixtures has, to date, restricted one against storing batches of polyol and hydrocarbon based blowing agent mixtures for use at a later time. Due to the poor solubility of various hydrocarbon based blowing agents in polyols, they must be added to the polyols under constant agitation and immediately before dispensing the foaming ingredients through a mixhead. The insolubility of various hydrocarbon based blowing agents also tends to lead to larger, coarser, or uneven cell structures in a polyurethane foam. As is well known, the thermal conductivity of a foam generally increases with a poor cell structure. Therefore, it has been critical that the blowing agent(s) employed be uniformly dispersed under constant agitation throughout the polyol mixture immediately prior to foaming in order to obtain a rigid polyurethane foam having the desired thermal insulation values.

In U.S. Pat. No. 5,391,317, Smits sought to manufacture a foam having both good dimensional stability and thermal insulation using hydrocarbons as blowing agents. This reference taught the use of a particular mixture of $C_{5-6}$ alicyclic alkanes, isopentane and n-pentane blowing agents in particular molar percents, in combination with a polyol mixture made up of an aromatic initiated polyether polyol, an aromatic polyester polyol, and a different amine initiated polyether polyol. As the aromatic initiated polyether polyol, Smits suggested using an alkylene oxide adduct of a phenol-formaldehyde resin. The particular mixture of alicyclic and isomeric aliphatic alkane blowing agents is taught by Smits as producing a foam having good thermal insulation values.

The problem of obtaining a closed cell rigid polyurethane foam having both good dimensional stability and thermal insulation at low densities was also discussed in "An Insight Into The Characteristics of a Nucleation Catalyst in HCFC-Free Rigid Foam Systems" by Yoshimura et al. This publication reported the results of evaluations on a host of catalysts used in a standard polyurethane formulation to test the effects of each catalyst on the thermal insulation and dimensional stability of the foam. The authors noted that the solubility of cyclopentane in the polyol composition was reduced by increasing the blending ratio of aromatic amine-based polyols. Furthermore, not only did the authors note that the solubility of cyclopentane in the polyols was reduced as the aliphatic amine-initiated polyether polyol content was reduced and the aromatic amine-initiated polyether polyol was increased, but also noted that no significant effect in thermal conductivity was observed when the aromatic amine-initiated polyether polyol content was increased.

SUMMARY OF THE INVENTION

It would be highly desirable to provide a polyol composition for making a dimensionally stable rigid closed cell polyurethane foam from such polyol composition having good thermal insulation properties.

Thus, there is now provided a storage stable polyol composition comprising a blowing agent and polyol composition containing at least:

a) an aromatic amine initiated polyoxyalkylene polyether polyol having an hydroxyl number of 200 meq polyol/g KOH or more;

b) an aliphatic amine initiated polyoxyalkylene polyether polyol having an hydroxyl number of 200 meq polyol/g KOH or more; and c) an aromatic polyester polyol having an hydroxyl number of 200 meq polyol/g KOH or more.

The blowing agent(s) utilized with the polyol composition is selected from the group consisting of cyclopentane, HFC's and HCFC's generally, with the amount of blowing agent present being at least about 5.0 weight percent based on the weight of the polyol composition. Further, the amount of aromatic polyester polyol is 18.0 weight percent or less based on the weight of the polyol composition. The blowing agent(s) are preferably soluble in the polyols used in the polyol composition. The blowing agents employed, and particularly the HFC's and HCFC's, when used in association with the polyol compositions of the present invention have also been found to offer faster demold times for the resulting foams. In addition, the resulting foams typically have lower densities, improved K factors, improved thermal insulation properties and improved dimensional stabilities over foams produced using other polyol systems.

There is also provided a polyisocyanate based rigid closed cell foam made by reacting an organic isocyanate with a polyol composition in the presence of a blowing agent, where the polyol composition contains at least:

a) an aromatic amine initiated polyoxyalkylene polyether polyol having an hydroxyl number of 200 meq polyol/g KOH or more;

b) an aliphatic amine initiated polyoxyalkylene polyether polyol having an hydroxyl number of 200 meq polyol/g KOH or more;

c) an aromatic polyester polyol having an hydroxyl number of 200 meq. polyol/g KOH or more, in an amount of 18.0 weight percent or less based on the weight of the polyol composition.

Again, the blowing agent is selected from the group consisting of cyclopentane, HFC's and HCFC's and is present in an mount of at least about 5.0 weight present based on the total weight of the polyol composition. By employing these constituents in the polyol composition, the blowing agent is generally soluble in the polyol composition. There is also provided a polyurethane foam where the polyol composition contains at least one of the aforementioned blowing agents.

The polyol composition preferably will solubilize the blowing agent in the polyol composition without sacrificing, and advantageously improving, the thermal insulation and dimensional stability of the resulting polyurethane foam. Contrary to Yoshimoto et al., it was surprising to discover that the aromatic amine initiated polyether polyol used in the invention impacted the thermal insulation of the foam.

There is also provided a method of making a polyisocyanate based rigid closed cell foam by reacting an organic isocyanate with a polyol composition into which is introduced (and preferably dissolved rather than emulsified) a blowing agent present in an amount of at least 5.0 weight percent or more based on the weight of the polyol composition, and further containing at least:

a) an aromatic amine initiated polyoxyalkylene polyether polyol having an hydroxyl number of 200 meq polyol/g KOH or more;

b) an aliphatic amine initiated polyoxyalkylene polyether polyol having an hydroxyl number of 200 meq polyol/g KOH or more; and c) an aromatic polyester polyol having an hydroxyl number of 200 meq. polyol/g KOH or more, in amount of 18.0 weight percent or less based on the weight of the polyol composition.

DETAILED DESCRIPTION OF THE INVENTION

There is provided a storage stable polyol composition made up of at least one blowing agent selected from the group consisting of cyclopentane, HFC's and HCFC's and the polyol composition described herein. A polyol composition is deemed "storage stable" or "soluble" when the polyol composition has the capacity of retaining the blowing agent in solution or in a dissolved state for a period of at least 5 days. The determination of whether or not the blowing agent is in solution or dissolved is measured by taking the blowing agent with the polyol composition ingredients in a clear glass jar, capping the jar, and letting the contents remain still for 5 days at room temperature without agitation. If upon visual inspection there is no phase separation such that two discrete layers are formed, the blowing agent is deemed soluble in the polyol composition, and the polyol composition is deemed storage stable.

This test which lasts at least five (5) days is only for purposes of measuring whether a particular polyol composition formulation is adequate to solubilize the blowing agent. As discussed further below, the blowing agent may be added to the polyol composition weeks prior to foaming, seconds prior to foaming, or right at the mix head. The scope of the invention includes each of these embodiments. By stating that the blowing agent is soluble in the polyol composition, it is meant that the polyol composition employed must be capable of solubilizing the blowing agent, and is neither limited to a specific point in the process at which the blowing agent is solubilized nor to a time period such as the five days used for purposes of measuring the capacity of the polyol composition for dissolving the blowing agent.

Where it is said that the polyol composition "contains" a blowing agent or that the blowing agent is "dissolved in" or "in solution" with the polyol composition, this would include those embodiments where the blowing agent is mixed with the other polyol composition ingredients for a period of time sufficient to dissolve the blowing agent in the polyol composition prior to introducing the polyol composition into the mix head for reaction with an organic isocyanate compound, and would not include those embodiments where the blowing agent is metered as a separate stream into a dispensing head for reaction with an organic isocyanate. That is not to say, however, that the blowing agent cannot be metered as a separate stream for reaction with an organic isocyanate to form the desired product.

The polyol composition contains polyols comprising at least the above mentioned a), b) and c) polyols. Other ingredients that may be included in the polyol composition are other polyols, catalysts, surfactants, blowing agents, fillers, stabilizers, and other additives. As used in this specification and in the claims, the term "polyol(s)" includes polyols having hydroxyl, thiol, and/or amine functionalities. The term "polyol(s)" as used herein, however, is limited to compounds containing at least some polyester or polyoxyalkylene groups, and having a number average molecular weight of 200 or more. Where the word "polyol(s)" is used in conjunction with and to modify the words polyether, polyester, or polyoxyalkylene polyether, the word "polyol" is then meant to define a polyhydroxyl functional polyether.

Both the a) and b) polyols are polyoxyalkylene polyether polyols. These polyols may generally be prepared by polymerizing alkylene oxides with polyhydric amines. Any suitable alkylene oxide may be used such as ethylene oxide, propylene oxide, butylene oxide, amylene oxide, and mixtures of these oxides. The polyoxyalkylene polyether polyols may be prepared from other starting materials such as tetrahydrofuran and alkylene oxide-tetrahydrofuran mixtures; epihalohydrins such as epichlorohydrin; as well as aralkylene oxides such as styrene oxide.

Included among the polyether polyols are polyoxyethylene polyols, polyoxypropylene polyols, polyoxybutylene polyols, polytetramethylene polyols, and block copolymers, for example combinations of polyoxypropylene and polyoxyethylene poly-1,2-oxybutylene and polyoxyethylene polyols, poly-1,4-tetramethylene and polyoxyethylene polyols, and copolymer polyols prepared from blends or sequential addition of two or more alkylene oxides. The polyoxyalkylene polyether polyols may be prepared by any known process such as, for example, the process disclosed by Wurtz in 1859 and *Encyclopedia of Chemical Technology*, Vol. 7, pp. 257–262, published by Interscience Publishers, Inc. (1951) or in U.S. Pat. No. 1,922,459. The alkylene oxides may be added to the initiator, individually, sequentially one after the other to form blocks, or in mixture to form a heteric polyether. The polyoxyalkylene polyether polyols may have either primary or secondary hydroxyl groups. It is preferred that at least one of the amine initiated polyols, more preferably both the a) and b) polyols, are polyether polyols terminated with a secondary hydroxyl group through addition of, for example, propylene oxide as the terminal block. It is preferred that one or both of the a) and b) amine initiated polyols contain 50 weight percent or more, and up to 100 weight percent, of secondary hydroxyl group forming alkylene oxides, such as polyoxypropylene groups, based on the weight of all oxyalkylene groups. This amount can be measured by adding 50 weight percent or more of the secondary hydroxyl group forming alkylene oxides to the initiator molecule in the course of manufacturing the polyol.

Suitable initiator molecules for the a) and b) compounds are primary or secondary amines. These would include, for the a) aromatic amine initiated polyether polyol, the aromatic amines such as aniline, N-alkylphenylene-diamines, 2,4'-, 2,2'-, and 4,4'-methylenedianiline, 2,6- or 2,4- toluenediamine, vicinal toluenediamines, o-chloro-aniline, p-aminoaniline, 1,5-diaminonaphthalene, methylene dianiline, the various condensation products of aniline and formaldehyde, and the isomeric diaminotoluenes, with preference given to vicinal toluenediamines.

For the aliphatic amine initiated b) polyol, any aliphatic amine, whether branched or unbranched, substituted or unsubstituted, saturated or unsaturated, may be used. These would include, as examples, mono-, di, and trialkanolamines, such as monoethanolamine, methylamine, triisopropanolamine; and polyamines such as ethylene diamine, propylene diamine, diethylenetriamine; or 1,3-diaminopropane, 1,3-diaminobutane, and 1,4-diaminobutane. Preferable aliphatic amines include any of the diamines and triamines, most preferably, the diamines.

In at least one embodiment of the present invention, each of the a) and b) polyols have number average molecular weights of 200–750 and nominal functionalities of 3 or more. By a nominal functionality, it is meant that the functionality expected is based upon the functionality of the initiator molecule, rather than the actual functionality of the final polyether after manufacture.

The c) polyol is an aromatic polyester polyol. Suitable polyester polyols include those suitable polyester polyols include those obtained, for example, from polycarboxylic acids and polyhydric alcohols. A suitable polycarboxylic acid may be used such as oxalic acid, malonic acid, succinic acid, glutaric acid, adipic acid, pimelic acid, suberic acid, azelaic acid, sebacic acid, brassylic acid, thapsic acid, maleic acid, fumaric acid, glutaconic acid, a-hydromuconic acid, β-hydromuconic acid, a-butyl-a-ethyl-glutaric acid, a,β-diethylsuccinic acid, isophthalic acid, therphthalic acid, phthalic acid, hemimellitic acid, and 1,4-cyclohexanedicarboxylic acid. A suitable polyhydric alcohol may be used such as ethylene glycol, propylene glycol, dipropylene glycol, trimethylene glycol, 1,2-butanediol, 1,5-pentanediol, 1,6-hexanediol, 1,7-heptanediol, hydroquinone, resorcinol glycerol, glycerine, 1,1,1-trimethylol-propane, 1,1,1-trimethylolethane, pentaerythritol, 1,2,6-hexanetriol, a-methyl glucoside, sucrose, and sorbitol. Also included within the term "polyhydric alcohol" are compounds derived from phenol such as 2,2-bis(4-hydroxyphenyl)-propane, commonly known as Bisphenol A.

The hydroxyl-containing polyester may also be a polyester amide such as is obtained by including some amine or amino alcohol in the reactants for the preparation of the polyesters. Thus, polyester amides may be obtained by condensing an amino alcohol such as ethanolamine with the polycarboxylic acids set forth above or they may be made using the same components that make up the hydroxyl-containing polyester with only a portion of the components being a diamine such as ethylene diamine.

A preferred aromatic polyester polyol useful in accordance with the teachings of the present invention is an alpha-methylglucoside initiated polyester polyol derived from polyethylene terephthalate. This polyol has a molecular weight of approximately 358, a hydroxyl number of about 360 meq polyol/g KOH and a nominal average functionality of 2.3.

As alluded to above, each of the polyols a), b) and c) have hydroxyl numbers of 200 or more meq polyol/g KOH. At hydroxyl numbers of less than 200, the dimensional stability of the foam begins to deteriorate. The optimum nominal functionality of each amine initiated polyol appears to be 4 or more, with hydroxyl numbers of 400 or more. Likewise, the optimum nominal functionality of aromatic polyester polyol appears to be 2 or more, with an average hydroxyl numbers of 350 or more.

The overall amount of aromatic polyester polyol c) is 18.0 weight percent or less and, more preferably, 15.0 weight percent or less based on the overall weight of all ingredients in the polyol composition. Thus, while the range of polyols a) and b) may vary widely (i.e. from about 20.0 to 80.0 weight percent of the polyol composition), under a preferred embodiment the weight ratio of the aromatic amine initiated polyol a) to the aliphatic amine initiated polyol b) will be between about 0.8:1.0 to 1.2:1. Therefore, the weight ratio of either polyol a) or b) to the aromatic polyester polyol c) is approximately 3:1 or greater.

The scope of the invention broadly includes a polyol composition containing the a), b) and c) polyols combined together in a mixture by separately manufacturing the polyether polyols and the polyester polyol, and subsequently combining the resulting polyols together into a mixture. Optionally, the a) and b) polyols can be prepared by a co-initiation method where the aromatic amine and the aliphatic amine initiators are first blended together, after which the alkylene oxide(s) are added and reacted onto the initiator blend; with the c) polyol being combined thereafter. The latter method is the preferred method.

In the latter method, the amount of aliphatic amine initiated polyether polyol in the polyol composition would be calculated based on the percentage of the aliphatic initiator in the initiator blend multiplied by the percentage of the polyether polyol (resulting from addition of the alkylene oxide onto the initiator blend) in the polyol composition.

Other polyols besides the a), b), and c) polyols described herein can and preferably are added to the polyol composition. These would include polythioether polyols, polyester amides and polyacetals containing hydroxyl groups, aliphatic polycarbonates containing hydroxyl groups, amine terminated polyoxyalkylene polyethers, polyester polyols, other polyoxyalkylene polyether polyols, and graft dispersion polyols. In addition, mixtures of at least two of the aforesaid polyols can be used. The preferable additional polyols are polyoxyalkylene polyether polyols and/or polyester polyols, however, the total mount of polyester polyols employed (including any polyester polyols in addition to polyol c)) will preferably not exceed 18.0 weight percent based on the total weight of the polyol composition.

The additional polyoxyalkylene polyether polyols besides the a) and b) polyols include those initiated with polyhydroxyl compounds. Examples of such initiators are trimethylolpropane, glycerine, sucrose, sorbitol, propylene glycol, dipropylene glycol, pentaerythritol, and 2,2-bis(4-hydroxyphenyl)-propane and blends thereof. The preferred polyols are initiated with polyhydroxyl compounds having at least 4 sites reactive with alkylene oxides, and further may be oxyalkylated solely with propylene oxide. In a more preferred embodiment, the additional polyol is a polyoxyalkylene polyether polyol having a nominal functionality of 5 or more, which may be initiated with a polyhydroxyl compound. The high functionality serves to increase the crosslink density to provide a dimensionally stable foam.

Suitable polyhydric polythioethers which may be condensed with alkylene oxides include the condensation product of thiodiglycol or the reaction product of a dicarboxylic acid such as is disclosed above for the preparation of the hydroxyl-containing polyesters with any other suitable thioether polyol.

Polyhydroxyl-containing phosphorus compounds which may be used include those compounds disclosed in U.S. Pat.

No. 3,639,542. Preferred polyhydroxyl-containing phosphorus compounds are prepared from alkylene oxides and acids of phosphorus having a $P_2O_5$ equivalency of from about 72 percent to about 95 percent.

Suitable polyacetals which may be condensed with alkylene oxides include the reaction produce of formaldehyde or other suitable aldehyde with a dihydric alcohol or an alkylene oxide such as those disclosed above.

Suitable aliphatic thiols which may be condensed with alkylene oxides include alkanethiols containing at least two —SH groups such as 1,2-ethanedithiol, 1,2-propanedithiol, 1,2-propanedithiol, and 1,6-hexanedithiol; alkene thiols such as 2-butane-1,4-dithiol; and alkene thiols such as 3-hexene-1,6-dithiol.

Also suitable are polymer modified polyols, in particular, the so-called graft polyols. Graff polyols are well known to the art and are prepared by the in situ polymerization of one or more vinyl monomers, preferably acrylonitrile and styrene, in the presence of a polyether polyol, particularly polyols containing a minor mount of natural or induced unsaturation. Methods of preparing such graft polyols may be found in columns 1–5 and in the Examples of U.S. Pat. No. 3,652,639; in columns 1–6 and the Examples of U.S. Pat. No. 3,823,201; particularly in columns 2–8 and the Examples of U.S. Pat. No. 4,690,956; and in U.S. Pat. No. 4,524,157; all of which patents are herein incorporated by reference.

Non-graft polymer modified polyols are also suitable, for example, as those prepared by the reaction of a polyisocyanate with an alkanolamine in the presence of a polyether polyol as taught by U.S. Pat. Nos. 4,293,470; 4,296,213; and 4,374,209; dispersions of polyisocyanurates containing pendant urea groups as taught by U.S. Pat. No. 4,386,167; and polyisocyanurate dispersions also containing biuret linkages as taught by U.S. Pat. No. 4,359,541. Other polymer modified polyols may be prepared by the in situ size reduction of polymers until the particle size is less than 20 mm, preferably less than 10 mm.

The average hydroxyl number of the a), b) and c) polyols in the polyol composition should be 200 meq polyol/g KOH or more and, more preferably 350 meq polyol/g KOH or more. Individual polyols may be used which fall below the lower limit, but the average should be within this range. Polyol compositions whose polyols are on avenge within this range make good dimensionally stable foams. In calculating whether the average hydroxyl number is within this range, by definition only those polyols having a number average molecular weight of 200 or more are taken into account.

The mount of additional polyols relative to the a), b) and c) polyols is not intended to be limited so long as the desired objective of manufacturing a dimensionally stable foam having good thermal insulation values, and optionally, but preferably solubilizing the blowing agent(s) in the polyol composition can be achieved. In this regard, it is believed that the aforementioned objectives can be achieved by using 50 weight percent or less of the combined weight of the a), b) and c) polyols, based on the weight of all polyols.

In addition to the foregoing, the invention also includes using at least one blowing agent selected from the group consisting of cyclopentane, HFC's, HCFC's and mixtures thereof. The blowing agents may be added and solubilized in the polyol composition for storage and later use in a foaming apparatus or may be added to a preblend tank in the foaming apparatus and preferably solubilized in the polyol composition immediately prior to pumping or metering the foaming ingredients to the mix head. Alternatively, the blowing agent may be added to the foaming ingredients in the mix head as a separate stream, although full solubility might be limited due to the short amount of time the blowing agent is exposed to the polyol composition in the mix head. The advantage of the polyol composition of the invention is that the polyol composition gives one the flexibility of stably storing polyol compositions containing the desired blowing agent, or solubilizing the blowing agent with the polyol composition in the preblend tank, or, for however short a period of time, adding it at the mix head, to manufacture a foam of the desired quality. We have found that the polyol composition of the invention is specially adapted to enable a variety of blowing agents to be employed including blowing agents selected from the group consisting of cyclopentane, HFC's, HCFC's and mixtures thereof to produce rigid closed cell polyisocyanate based foams meeting the desired objectives.

The amount of blowing agent used is 5.0 weight percent or more based on the weight of the polyol composition. The particular amount of blowing agent(s) will depend in large part upon the desired density of the foam product. For most applications, polyurethane free rise densities for thermal insulation applications range from free rise densities of 0.5 to 10 pcf, preferably from 1.2 to 2.5 pcf. The preferred overall densities of foams packed to 10% by weight, meaning the percentage by weight of foam ingredients above the theoretical mount needed to fill the volume of the mold upon foaming, are from about 1.2 to about 2.5 pcf, more preferably from 1.3 to 2.0 pcf. The amount by weight of all blowing agents is generally, based on the polyol composition, from about 5.0 weight percent to 40.0 weight percent, and more preferably, 7.0 weight percent to 36.0 weight percent.

Suitable hydrofluorocarbons, perfluorinated hydrocarbons, and fluorinated ethers (collectively referred to herein as HFC's) which are useful in accordance with the teachings of the present invention include difluoromethane (HFC-32); 1,1,1,2-tetrafluoroethane (HFC-134a); 1,1,2,2-tetrafluoroethane (HFC-134); 1,1-difluoroethane (HFC-152a); 1,2-difluoroethane (HFC-142), trifluoromethane; heptafluoropropane; 1,1,1-trifluoroethane; 1,1,2-trifluoroethane; 1,1,1,2,2-pentafluoropropane; 1,1,1,3,3-pentafluoropropane (HFC 245fa); 1,1,1,3-tetrafluoropropane; 1,1,2,3,3-pentafluoropropane; 1,1,1,3,3-pentafluoro-n-butane; 1,1,1,2,3,3,3-heptafluoropropane (HFC 227ea); hexafluorocyclopropane (C-216); octafluorocyclobutane (C-318); perfluorotetrahydrofuran; perfluoroalkyl tetrahydrofurans; perfluorofuran; perfluoropropane, -butane, -cyclobutane, -pentane, -cyclopentane, and -hexane, -cyclohexane, -heptane, and -octane; perfluorodiethyl ether; perfluorodipropyl ether; and perfluoroethyl propyl ether. Preferred among the HFC blowing agents are HFC 134a and HFC 236ea, respectively.

Suitable hydrochlorofluorocarbon blowing agents which may be used in accordance with the teaching of the present invention are 1-chloro-1,2-difluoroethane; 1-chloro- 2,2-difluoroethane (142a); 1-chloro-1,1-difluoroethane (142b); 1,1-dichloro-1-fluoroethane (141b); 1-chloro-1,1,2-trifluoroethane; 1-chloro-1,2,2-trifluoroethane; 1,1-diochloro-1,2-difluoroethane; 1-chloro-1,1,2,2-tetrafluoroethane (124 a); 1-chloro-1,2,2,2-tetrafluoroethane (124); 1,1-dichloro-1,2,2-trifluoroethane; 1,1-dichloro-2,2,2-trifluoroethane (123); and 1,2-dichloro-1,1,2-trifluoroethane (123a); monochlorodifluoromethane (HCFC-22); 1-chloro-2,2,2-trifluoroethane (HCFC-133a); gem-chlorofluoroethylene (R-1131a); chloroheptafluoropropane (HCFC-217); chlorodifluoroethylene (HCFC-1122); and trans-chlorofluoroethylene (HCFC-1131). The most preferred hydrochlorofluorocarbon blowing agent is 1,1-dichloro-1-fluoroethane (HCFC-141b).

The blowing agents which can be used in addition to the blowing agents selected from the group consisting of cyclopentane, HFC's, HCFC's and mixtures thereof, may be divided into the chemically active blowing agents which chemically react with the isocyanate or with other formulation ingredients to release a gas for foaming, and the physically active blowing agents which are gaseous at the exotherm foaming temperatures or less without the necessity for chemically reacting with the foam ingredients to provide a blowing gas. Included within the meaning of physically active blowing agents are those gases which are thermally unstable and decompose at elevated temperatures.

Examples of chemically active blowing agents are preferentially those which react with the isocyanate to liberate gas, such as $CO_2$. Suitable chemically active blowing agents include, but are not limited to, water, mono- and polycarboxylic acids having a molecular weight of from 46 to 300, salts of these acids, and tertiary alcohols.

Water is preferentially used as a blowing agent. Water reacts with the organic isocyanate to liberate $CO_2$ gas which is the actual blowing agent. However, since water consumes isocyanate groups, an equivalent molar excess of isocyanate must be used to make up for the consumed isocyanates. Water is typically found in minor quantities in the polyols as a byproduct and may be sufficient to provide the desired blowing from a chemically active substance. Preferably, however, water is additionally introduced into the polyol composition in mounts from 0.02 to 5 weight percent, preferably from 0.5 to 3 weight percent, based on the weight of the polyol composition.

The organic carboxylic acids used are advantageously aliphatic mono- and polycarboxylic acids, e.g. dicarboxylic acids. However, other organic mono- and polycarboxylic acids are also suitable. The organic carboxylic acids may, if desired, also contain substituents which are inert under the reaction conditions of the polyisocyanate polyaddition or are reactive with isocyanate, and/or may contain olefinically unsaturated groups. Specific examples of chemically inert substituents are halogen atoms, such as fluorine and/or chlorine, and alkyl, e.g. methyl or ethyl. The substituted organic carboxylic acids expediently contain at least one further group which is reactive toward isocyanates, e.g. a mercapto group, a primary and/or secondary amino group, or preferably a primary and/or secondary hydroxyl group.

Suitable carboxylic acids are thus substituted or unsubstituted monocarboxylic acids, e.g. formic acid, acetic acid, propionic acid, 2-chloropropionic acid, 3-chloropropionic acid, 2,2-dichloropropionic acid, hexanoic acid, 2-ethylhexanoic acid, cyclohexanecarboxylic acid, dodecanoic acid, palmitic acid, stearic acid, oleic acid, 3-mercaptopropionic acid, glycolic acid, 3-hydroxypropionic acid, lactic acid, ricinoleic acid, 2-aminopropionic acid, benzoic acid, 4-methylbenzoic acid, salicylic acid and anthranilic acid, and unsubstituted or substituted polycarboxylic acids, preferably dicarboxylic acids, e.g. oxalic acid, malonic acid, succinic acid, fumaric acid, maleic acid, glutaric acid, adipic acid, sebacic acid, dodecanedoic acid, tartaric acid, phthalic acid, isophthalic acid and citric acid. Preferable acids are formic acid, propionic acid, acetic acid, and 2-ethylhexanoic acid, particularly formic acid.

The amine salts are usually formed using tertiary amines, e.g. triethylamine, dimethylbenzylamine, diethylbenzylamine, triethylenediamine, or hydrazine. Tertiary amine salts of formic acid may be employed as chemically active blowing agents which will react with the organic isocyanate. The salts may be added as such or formed in situ by reaction between any tertiary amine (catalyst or polyol) and formic acid contained in the polyol composition.

Combinations of any of the aforementioned chemically active blowing agents may be employed, such as formic acid, salts of formic acid, and/or water.

Physically active blowing agents are those which boil at the exotherm foaming temperature or less, preferably at 50° C. or less. The most preferred physically active blowing agents are those which have an ozone depletion potential of 0.05 or less. Examples of physically active blowing agents are the volatile non-halogenated hydrocarbons having two to seven carbon atoms such as alkanes, alkenes, cycloalkanes having up to 6 carbon atoms, dialkyl ethers, cycloalkylene ethers and ketones; and decomposition products.

Examples of volatile non-halogenated hydrocarbons include linear or branched alkanes, e.g. butane, isobutane, 2,3 dimethylbutane, n- and isopentane and technical-grade pentane mixtures, n- and isohexanes, n- and isoheptanes, n- and isooctanes, n- and isononanes, n- and isodecanes, n- and isoundecanes, and n- and isododecanes. N-pentane, isopentane or n-hexane, or a mixture thereof are preferably employed as additional blowing agents. Furthermore, specific examples of alkenes are 1-pentene, 2-methylbutene, 3-methylbutene, and 1-hexene, of cycloalkanes in addition to cyclopentane are cyclobutane and cyclohexane, specific examples of linear or cyclic ethers are dimethyl ether, diethyl ether, methyl ethyl ether, vinyl methyl ether, vinyl ethyl ether, divinyl ether, tetrahydrofuran and furan, and specific examples of ketones are acetone, methyl ethyl ketone and cyclopentanone. Pure or technical grade cyclopentane may be used, the latter containing about 70 weight percent cyclopentane with the remainder including 2,3 dimethylbutane, pentane, and isopentane. Mixtures of cyclopentane, pentane, and isopentane as deserted in U.S. Pat. No. 5,391,317 are also included and incorporated herein by reference.

Decomposition type physically active blowing agents which release a gas through thermal decomposition include pecan flour, amine/carbon dioxide complexes, and alkyl alkanoate compounds, especially methyl and ethyl formates.

Catalysts may be employed which greatly accelerate the reaction of the compounds containing hydroxyl groups and with the modified or unmodified polyisocyanates. Examples of suitable compounds are cure catalysts which also function to shorten tack time, promote green strength, and prevent foam shrinkage. Suitable cure catalysts are organometallic catalysts, preferably organolin catalysts, although it is possible to employ metals such as lead, titanium, copper, mercury, cobalt, nickel, iron, vanadium, antimony, and manganese. Suitable organometallic catalysts, exemplified here by tin as the metal, are represented by the formula: $R_nSn[X-R^1-Y]_2$, wherein R is a $C_1-C_8$ alkyl or aryl group, $R^1$ is a $C_0-C_{18}$ methylene group optionally substituted or branched with a $C_1-C_4$ alkyl group, Y is hydrogen or an hydroxyl group, preferably hydrogen, X is methylene, an —S—, an —$SR^2COO$—, —SOOC—, an —$O_3S$—, or an —OOC— group wherein $R^2$ is a $C_1-C_4$ alkyl, n is 0 or 2, provided that $R^1$ is $C_0$ only when X is a methylene group. Specific examples are tin (II) acetate, tin (II) octanoate, tin (II) ethylhexanoate and tin (II) laurate; and dialkyl (1-8C) tin (IV) salts of organic carboxylic acids having 1-32 carbon atoms, preferably 1–20 carbon atoms, e.g., diethyltin diacetate, dibutyltin diacetate, dibutyltin diacetate, dibutyltin dilaurate, dibutyltin maleate, dihexyltin diacetate, and dioctyltin diacetate. Other suitable organotin catalysts are organotin alkoxides and mono or polyalkyl (1–8C) tin (IV) salts of inorganic compounds such as butyltin trichloride, dimethyl- and diethyl- and dibutyl- and dioctyl- and diphenyl- tin oxide, dibutyltin dibutoxide, di(2-ethylhexyl) tin oxide, dibutyltin dichloride, and dioctyltin dioxide. Preferred, however, are tin catalysts with tin-sulfur bonds which are resistant to hydrolysis, such as dialkyl (1–20C) tin dimercaptides, including dimethyl-, dibutyl-, and dioctyl- tin dimercaptides.

Tertiary amines also promote urethane linkage formation, and include triethylamine, 3-methoxypropyldimethylamine, triethylenediamine, tributylamine, dimethylbenzylamine, N-methyl-, N-ethyl- and N-cyclohexylmorpholine, N,N,N',N'-tetramethylethylenediamine, N,N,N',N'-tetramethylbutanediamine or -hexanediamine, N,N,N'-trimethyl isopropyl propylenediamine, pentamethyldiethylenetriamine, tetramethyldiaminoethyl ether, bis(dimethylaminopropyl)urea, dimethylpiperazine, 1-methyl-4-dimethylaminoethylpiperazine, 1,2-dimethylimidazole, 1-azabicylo[3.3.0]octane and preferably 1,4-diazabicylo[2.2.2]octane, and alkanolamine compounds, such as triethanolamine, triisopropanolamine, N-methyl- and N-ethyldiethanolamine and dimethylethanolamine.

To prepare the polyisocyanurate (PIR) and PUR-PIR foams by the process according to the invention, a polyisocyanurate catalyst is employed. Suitable polyisocyanurate catalysts are alkali salts, for example, sodium salts, preferably potassium salts and ammonium salts, of organic carboxylic acids, expediently having from 1 to 8 carbon atoms, preferably 1 or 2 carbon atoms, for example, the salts of formic acid, acetic acid, propionic acid, or octanoic acid, and tris(dialkylaminoethyl)-, tris(dimethylaminopropyl)-, tris(dimethylaminobutyl)- and the corresponding tris(diethylaminoalkyl)-s-hexahydrotriazines. However, (trimethyl-2-hydroxypropyl)ammonium formate, (trimethyl-2-hydroxypropyl)ammonium octanoate, potassium acetate, potassium formate and tris(dimethylaminopropyl)-s-hexahydrotriazine are polyisocyanurate catalysts which are generally used. The suitable polyisocyanurate catalyst is usually used in an amount of from 1 to 10 parts by weight, preferably from 1.5 to 8 parts by weight, based on 100 pans by weight of the total amount of polyols.

Urethane-containing foams may be prepared with or without the use of chain extenders and/or crosslinking agents, which are not necessary in this invention to achieve the desired mechanical hardness and dimensional stability. The chain extenders and/or crosslinking agents used have a number average molecular weight of less than 400, preferably from 60 to 300; or if the chain extenders have polyoxyalkylene groups, then having a number average molecular weight of less than 200. Examples are dialkylene glycols and aliphatic, cycloaliphatic and/or araliphatic diols having from 2 to 14 carbon atoms, preferably from 4 to 10 carbon atoms, e.g., ethylene glycol, 1,3-propanediol, 1,10-decanediol, o-, m-, and p-dihydroxycyclohexane, diethylene glycol, dipropylene glycol, and preferably 1,4-butanediol, 1,6-hexanediol, bis(2-hydroxyethyl)hydroquinone, triols such as 1,2,4- and 1,3,5-trihydroxycyclohexane, glycerol, and trimethylolpropane.

Polyurethane foams can also be prepared by using secondary aromatic diamines, primary aromatic diamines, 3,3'-di- and/or 3,3'-, 5,5'-tetraalkyl-substituted diaminodiphenylmethanes as chain extenders or crosslinking agents instead of or mixed with the above-mentioned diols and/or triols.

The amount of chain extender, crosslinking agent or mixture thereof used, if any, is expediently from 2 to 20 percent by weight, preferably from 1 to 15 percent by weight, based on the weight of the polyol composition. However, as previously alluded to, it is preferred that no chain extender/crosslinker is used for the preparation of rigid foams since the polyether polyols described above are sufficient to provide the desired mechanical properties.

If desired, assistants and/or additives can be incorporated into the reaction mixture for the production of the cellular plastics by the polyisocyanate polyaddition process. Specific examples are surfactants, foam stabilizers, cell regulators, fillers, dyes, pigments, flame-proofing agents, hydrolysis-protection agents, and fungistatic and bacteriostatic substances.

Examples of suitable surfactants are compounds which serve to support homogenization of the starting materials and may also regulate the cell structure of the plastics. Specific examples are salts of sulfonic acids, e.g., alkali metal salts or ammonium salts of dodecylbenzene- or dinaphthylmethanedisulfonic acid and ricinoleic acid; foam stabilizers, such as siloxane-oxyalkylene copolymers and other organopolysiloxanes, oxyethylated alkyl-phenols, oxyethylated fatty alcohols, paraffin oils, castor off esters, ricinoleic acid esters, Turkey red off and groundnut oil, and cell regulators, such as paraffins, fatty alcohols, and dimethylpolysiloxanes. The surfactants are usually used in amounts of 0.01 to 5 parts by weight, based on 100 parts by weight of the polyol component.

For the purposes of the invention, fillers are conventional organic and inorganic fillers and reinforcing agents. Specific examples are inorganic fillers, such as silicate minerals, for example, phyllosilicates such as antigorite, serpentine, hornblends, amphiboles, chrysotile, and talc; metal oxides, such as kaolin, aluminum oxides, titanium oxides and iron oxides; metal salts, such as chalk, barite and inorganic pigments, such as cadmium sulfide, zinc sulfide and glass, inter alia; kaolin (china clay), aluminum silicate and co-precipitates of barium sulfate and aluminum silicate, and natural and synthetic fibrous minerals, such as wollastonite, metal, and glass fibers of various lengths. Examples of suitable organic fillers are carbon black, melamine, colophony, cyclopentadienyl resins, cellulose fibers, polyamide fibers, polyacrylonitrile fibers, polyurethane fibers, and polyester fibers based on aromatic and/or aliphatic dicarboxylic acid esters, and in particular, carbon fibers.

The inorganic and organic fillers may be used individually or as mixtures and may be introduced into the polyol composition or isocyanate side in amounts of from 0.5 to 40 percent by weight, based on the weight of components (the polyol composition and the isocyanate); but the content of mats, nonwovens and wovens made from natural and synthetic fibers may reach values of up to 80 percent by weight.

Examples of suitable timeproofing agents are tricresyl phosphate, tris(2-chloroethyl) phosphate, tris(2-chloropropyl) phosphate, and tris(2,3-dibromopropyl) phosphate.

In addition to the above-mentioned halogen-substituted phosphates, it is also possible to use inorganic or organic flameproofing agents, such as red phosphorus, aluminum oxide hydrate, antimony trioxide, arsenic oxide, ammonium polyphosphate (Exolit®) and calcium sulfate, expandable graphite or cyanuric acid derivatives, e.g., melamine, or mixtures of two or more flameproofing agents, e.g., ammonium polyphosphates and melamine, and, if desired, corn starch, or ammonium polyphosphate, melamine, and expandable graphite and/or, if desired, aromatic polyesters, in order to flameproof the polyisocyanate polyaddition products. In general, from 2 to 50 parts by weight, preferably from 5 to 25 parts by weight, of said flameproofing agents may be used per 100 parts by weight of the polyol composition.

Further details on the other conventional assistants and additives mentioned above can be obtained from the specialist literature, for example, from the monograph by J. H. Saunders and K. C. Frisch, High Polymers, Volume XVI, Polyurethanes, Parts 1 and 2, Interscience Publishers 1962 and 1964, respectively, or Kunststoff-Handbuch, Polyurethane, Volume VII, Carl-Hanser-Verlag, Munich, Vienna, 1st and 2nd Editions, 1966 and 1983.

Suitable organic polyisocyanates, defined as having 2 or more isocyanate functionalities, are conventional aliphatic, cycloaliphatic, araliphatic and preferably aromatic isocyanates. Specific examples include: alkylene diisocyanates with 4 to 12 carbons in the alkylene radical such as 1,12-dodecane diisocyanate, 2-ethyl-1,4-tetramethylene diisocyanate, 2-methyl-1,5-pentamethylene diisocyanate, 1,4-tetramethylene diisocyanate and preferably 1,6-hexamethylene diisocyanate; cycloaliphatic diisocyanates such as 1,3- and 1,4-cyclohexane diisocyanate as well as any mixtures of these isomers, 1-isocyanato-3,3,5-trimethyl-5-isocyanatomethylcyclohexane (isophorone diisocyanate), 2,4- and 2,6-hexahydrotoluene diisocyanate as well as the corresponding isomeric mixtures, 4,4'- 2,2'-, and 2,4'-dicyclohexylmethane diisocyanate as well as the corresponding isomeric mixtures and preferably aromatic diisocyanates and polyisocyanates such as 2,4- and 2,6-toluene diisocyanate and the corresponding isomeric mixtures 4,4'-, 2,4'-, and 2,2'-diphenylmethane diisocyanate and the corresponding isomeric mixtures, mixtures of 4,4'-, 2,4'-, and 2,2-diphenylmethane diisocyanates and polyphenylenepolymethylene polyisocyanates (crude MDI), as well as mixtures of crude MDI and toluene diisocyanates. The organic di- and polyisocyanates can be used individually or in the form of mixtures. Particularly preferred for the production of rigid foams is crude MDI containing about 50 to 70 weight percent polyphenyl-polymethylene polyisocyanate and from 30 to 50 weight percent diphenylmethane diisocyanate, based on the weight of all polyisocyanates used.

Frequently, so-called modified multivalent isocyanates, i.e., products obtained by the partial chemical reaction of organic diisocyanates and/or polyisocyanates are used. Examples include diisocyanates and/or polyisocyanates containing ester groups, urea groups, biuret groups, allophanate groups, carbodiimide groups, isocyanurate groups, and/or urethane groups. Specific examples include organic, preferably aromatic, polyisocyanates containing urethane groups and having an NCO content of 33.6 to 15 weight percent, preferably 31 to 21 weight percent, based on the total weight, e.g., with low molecular weight diols, triols, dialkylene glycols, trialkylene glycols, or polyoxyalkylene glycols with a molecular weight of up to 6000; modified 4,4'-diphenylmethane diisocyanate or 2,4- and 2,6-toluene diisocyanate, where examples of di- and polyoxyalkylene glycols that may be used individually or as mixtures include diethylene glycol, dipropylene glycol, polyoxyethylene glycol, polyoxypropylene glycol, polyoxyethylene glycol, polyoxypropylene glycol, and polyoxypropylene polyoxyethylene glycols or -triols. Prepolymers containing NCO groups with an NCO content of 29 to 3.5 weight percent, preferably 21 to 14 weight percent, based on the total weight and produced from the polyester polyols and/or preferably polyether polyols described below; 4,4'-diphenylmethane diisocyanate, mixtures of 2,4'- and 4,4'-diphenylmethane diisocyanate, 2,4,- and/or 2,6-toluene diisocyanates or polymeric MDI are also suitable. Furthermore, liquid polyisocyanates containing carbodiimide groups having an NCO content of 33.6 to 15 weight percent, preferably 31 to 21 weight percent, based on the total weight, have also proven suitable, e.g., based on 4,4'- and 2,4'- and/or 2,2'-diphenylmethane diisocyanate and/or 2,4'- and/or 2,6-toluene diisocyanate. The modified polyisocyanates may optionally be mixed together or mixed with unmodified organic polyisocyanates such as 2,4'- and 4,4'-diphenylmethane diisocyanate, polymeric MDI, 2,4'- and/or 2,6-toluene diisocyanate.

The organic isocyanates used in the invention preferably have an average functionality of greater than 2, most preferably 2.5 or more. This provides for a greater crosslinking density in the resulting foam, which improves the dimensional stability of the foam.

To produce the rigid closed cell polyurethane foams of the present invention, the organic polyisocyanate and the isocyanate reactive compounds are reacted in such amounts that the isocyanate index, defined as the number of equivalents of NCO groups divided by the total number of isocyanate reactive hydrogen atom equivalents multiplied by 100, ranges from 80 to less than 150, preferably from 90 to 110. The polyol composition of the invention affords one the flexibility of a large processing window in that the solubility of the polyol composition and the dimensional stability and thermal insulation of the resulting foam are substantially unaffected throughout a wide range of isocyanate indices. If the rigid foams contain, at least in part, bonded isocyanurate groups, an isocyanate index of 150 to 6000, preferably from 200 to 800, is usually used.

In a method of the invention, there is provided the reaction of an organic isocyanate with a polyol composition containing at least:

a) an aromatic amine initiated polyoxyalkylene polyether polyol having an hydroxyl number of 200 meq polyol/g KOH or more;

b) an aliphatic amine initiated polyoxyalkylene polyether polyol having an hydroxyl number of 200 meq polyol/g KOH or more in an mount of 10 weight percent or less based on the weight of the polyol composition;

c) an aromatic polyester polyol having an hydroxyl number of 200 meq. polyol/g KOH or more, in an amount of 18.0 weight percent or less based on the weight of the polyol composition; and d) a blowing agent selected from the group consisting of cyclopentane, HFC's and HCFC's.

Optionally, but preferably, the hydrocarbon based blowing agent is dissolved in the polyol composition. In one embodiment, the polyol composition contains the blowing agent in solution prior to reaction with the organic isocyanate. Preferably, the organic isocyanate and the polyol composition are reacted at isocyanate indices ranging from 80 to 115. All throughout this range the K-factors of the foam are substantially constant and the foams are dimensionally stable. A substantially constant K-factor value means that the variance in values is ±10 percent or less between the lowest and highest values within the range. Throughout the range, the foam also remains dimensionally stable as defined below. The measurements for the K-factor are taken from core samples as described below in the definition of a dimensionally stable foam and are the initial K-factors.

The rigid foams made from polyisocyanate polyaddition products are advantageously produced by the one-shot process, for example, using reaction injection moldings, or the high pressure or low pressure method, in an open or closed mold, for example, in a metallic mold, or in a pour-in-place application where the surfaces contacting the reaction mixture become a part of the finished article.

The starting components may be mixed at from 15° to 90° C., preferably at from 20° to 35° C., and introduced into the open or closed mold, if desired under super-atmospheric pressure. The mixing of the isocyanate with the polyol composition containing dissolved blowing agent can be carried out mechanically by means of a stirrer or a stirring screw or under high pressure by the impingement injection method. The mold temperature is expediently from 20° to 110° C., preferably from 30° to 60° C., in particular from 45° to 50° C.

The rigid foams produced by the process according to the invention and the corresponding structural foams are used, for example, in the vehicle industry—the automotive, aircraft, and ship building industries—and in the furniture and sports goods industries. They are particularly suitable in the construction and refrigeration sectors as thermal insulators, for example, as intermediate layers for laminate board or for foam-filling refrigerators, freezer housings, and picnic coolers.

For pour-in-place applications, the rigid foam may be poured or injected to form a sandwich structure of a first substrate/foam/second substrate or may be laminated over a substrate to form a substrate foam structure. The first and second substrate may each be independently made of the same material or of different materials, depending upon the end use. Suitable substrate materials comprise metal such as aluminum, tin, or formed sheet metal such as used in the case of refrigeration cabinets; wood, including composite wood; acrylonitrile-butadiene-styrene (ABS) triblock of rubber, optionally modified with styrene-butadiene diblock, styrene-ethylene/butylene-styrene triblock, optionally functionalized with maleic anhydride and/or maleic acid, polyethylene terephthalate, polycarbonate, polyacetals, rubber modified high impact polystyrene (HIPS), blends of HIPS with polyphenylene oxide, copolymers of ethylene and vinyl acetate, ethylene and acrylic acid, ethylene and vinyl alcohol, homopolymers or copolymers of ethylene and propylene such as polypropylene, high density polyethylene, high molecular weight high density polyethylene, polyvinyl chloride, nylon 66, or amorphous thermoplastic polyesters. Preferred are aluminum, tin, ABS, HIPS, polyethylene, and high density polyethylene.

The polyurethane foam may be contiguous to and bonded to the inner surfaces of the first and second substrates, or the polyurethane foam may be contiguous to a layer or lamina of synthetic material interposed between the substrates. Thus, the sequence of layers in the composite may also comprise a first substrate/polyurethane foam/layer or lamina/second substrate or first substrate/layer or lamina/polyurethane foam/layer or lamina/second substrate.

The layer or lamina of layers additionally interposed into the composite may comprise any one of the above-mentioned synthetic resins which have good elongation such as low density polyethylene or low density linear polyethylene as a stress relief layer or a material which promotes adhesion between the polyurethane foam and the first and/or second substrate of choice.

When a synthetic plastic material such as polyethylene having few or no bonding or adhesion sites is chosen as the first and/or second substrate as an alternative to an adhesion-promoting layer, it is useful to first modify the substrate surface with a corona discharge or with a flame treatment to improve adhesion to the polyurethane foam.

During the foam-in-place operation, the substrates are fixed apart in a spaced relationship to define a cavity between the first substrate and second substrate, and optionally the inner surface of at least one substrate, preferably both, treated to promote adhesion. This cavity is then filled with a liquid polyurethane system which reacts and foams in situ, bonding to the inner surfaces of the first and second substrates. In the case of a refrigeration unit or a cooler container, such as a picnic cooler, a thermoformed inner liner material is inserted into the outer shell of cooler or the refrigeration cabinet, in a nested spaced relationship to define a cavity, which cavity is then filled with a foamed-in-place polyurethane foam. In many cases, it is only the polyurethane foam which holds together the outer shell and inner liner, underscoring the need for foam dimensional stability.

The polyurethane cellular products of the invention are rigid, meaning that the ratio of tensile strength to compressive strength is high, on the order of 0.5:1 or greater, and having less than 10 percent elongation. The foams are also closed cell, meaning that the number of open cells is 20% or less, or conversely the number of closed cells is 80% or greater, the measurement being taken on a molded foam packed at 10% over the theoretical amount required to fill the mold with foam.

The rigid polyurethane cellular products of the invention are dimensionally stable, exhibiting little or no shrinkage, even at free rise densities of 2.0 pcf or less. In a preferred embodiment, the rigid polyurethane cellular products of the invention tested according to ASTM D 2126-87 using core samples of density 2.0 pcf or less with dimensions of 3"×3"×1" and taken from a 10% packed boxes measuring 4"×10"×10" advantageously have the following dimensional changes at 28 days of exposure: at 100° F./100 percent RH, i.e. relative humidity, no more than ±5 percent, more preferably no more than ±3 percent; at 158° F./100 percent RH no more than ±5 percent, most preferably less than ±4 percent; at 158° F., dry no more than ±8 percent, preferably no more than ±6 percent; at 200° F., dry no more than ±5, preferably no more than ±3 percent; and at −20° F. after 7 days exposure no more than ±5 percent, preferably no more than ±3 percent.

The thermal insulation values of the rigid closed cell foams according to the preferred embodiments of the invention are 0.160 BTU-in./hr.-ft$^2$-F or less initial, more preferably 0.150 or less initial, measured from the core of a 10% overpacked sample. It has been found that foams made with the combination of aliphatic and aromatic amine initiated polyether polyols as well as aromatic polyesters polyols exhibited relatively low k-factors. Furthermore, it has been found that the blowing agent is only sparingly soluble in polyol compositions which employ more than approximately 18.0 weight percent of an aromatic polyester polyol constituent.

In a preferred embodiment, the rigid polyurethane foams are also advantageously not friable at their surface in spite of their low density and the presence of polyols having a high hydroxyl number and low equivalent weight. These foams typically exhibit a surface friability of less than 5 percent when tested according to ASTM C 421, at core densities of 2.0 pcf or less, even at core densities of 1.5 pcf or less. The low surface friability enables the foam to adhere well to substrates.

The term polyisocyanate based foam as used herein is meant to include polyurethane-polyurea, polyurethane-polyisocyanurate, polyurethane, and polyisocyanurate foams.

WORKING EXAMPLES

Polyol A is a sucrose-dipropylene glycol co-initiated polyoxypropylene polyether polyol having a nominal OH number of about 397.

Polyol B is a polyoxyethylene-polyoxypropylene polyether polyol co-initiated with about 90 percent vicinal toluene-diamine and about 10 percent ethylenediamine, based on the weight of the initiators, the polyol being terminated with about 68 weight percent oxypropylene groups based on the weight of all oxyalkylene groups, and having a nominal OH number of about 500.

Polyol C is an alpha-methylglucoside initiated aromatic polyester polyol having a nominal OH number of about 360.

POLYCAT®5 is pentamethyl-diethylenetriamine, a catalyst used in the preparation of rigid foams, commercially available from Air Products.

DMCHA is dimethylcyclohexylamine, commercially available from BASF Corporation.

UL-1 is dibutyltin dimercaptide available from Air Products.

ISO A is polymethylene polyphenylene polyisocyanate having an free NCO content of 31.8 percent and a functionality of approximately 2.7.

EXAMPLE 1

The amounts of 45.0 parts by weight of Polyol A, 40.0 pans by weight of Polyol B, 15.0 parts by weight of Polyol C, 0.9 parts by weight of POLYCAT 5, 0.8 parts by weight of DMCHA, 0.1 parts by weight of UL-1, and between 2.0 and 2.5 parts by weight of water depending on the blowing agent employed were blended together. Thereafter, a different blowing agent as set forth in Table I was added under constant mixing to the respective polyol compositions.

Each polyol composition, including the differing blowing agents, was mixed into a 1.5 gallon steel tank and attached to an Edge-Sweets® high pressure impingement mix machine. Varying amounts of ISO A were added to the different polyol compositions in the isocyanate tank and impingement mixed. The parameters for the Edge-Sweets® high pressure impingement mix machine were calibrated for consistency and the resulting foams allowed to free rise as set forth in Table I for between 7 and 28 days.

TABLE 1

|  | SAMPLE | | | |
| --- | --- | --- | --- | --- |
|  | 1 | 2 | 3 | 4 |
| Polyol A | 45 | 45 | 45 | 45 |
| Polyol B | 40 | 40 | 40 | 40 |
| B-8404 | 15 | 15 | 15 | 15 |
| POLYCAT 5 | 0.90 | 0.90 | 0.90 | 0.90 |
| DMCHA | 0.60 | 0.60 | 0.60 | 0.60 |
| Water | 2.0 | 2.2 | 2.0 | 2.5 |
| Hydrocarbon Blowing Agents | 14[1] | 15[2] | 38[3] | 35.8[4] |
| TOTAL | 117.5 | 118.5 | 138.50 | 138.5 |
| ISO A | 147.23 | 148.4 | 145.77 | 180 |
| Density, F.R. (pcf) | 1.74 | 1.81 | 1.68 | 1.4 |
| Initial K-Factor (but/in/hr. ft.$^2$ °F.) | 0.152 | 0.148 | 0.152 | 0.138 |
| SSC (Percent Vol. Change) | | | | |
| 100° F., 100% R.H., 28 days | +1.0 | +1.1 | −0.5 | +2.16 |
| 158° F., 100% RH 28 days | +2.1 | +0.1 | +2.2 | +3.31 |
| 158° F., dry, 28 days | +0.9 | +5.3 | 0.0 | +1.54 |
| 200° F., dry 28 days | +2.3 | +2.7 | +3.7 | +2.74 |
| 200° F., dry 7 days | +0.3 | −1.3 | −0.1 | +1.1 |

[1]cyclopentane
[2]HFC 134a
[3]HFC 236 ea
[4]HCFC 141b

The dimensional stability of each sample under simulated conditions as a function of the blowing agent employed as recorded in Table I illustrates that the three component polyol blend described affords a great deal of flexibility in choosing a blowing agent for polyurethane foams for insulation critical applications. Regardless of whether the blowing agent is a hydrocarbon such as cyclopentane, an HFC or HCFC, the polyol blend described herein when used is a formulated system, provides for excellent dimensional stability under a number of service conditions.

What we claim:

1. A method of making a polyisocyanate based rigid closed cell foam comprising reacting an organic isocyanate with a polyol composition in the presence of a blowing agent, said polyol composition comprising:
   a) an aromatic amine initiated polyoxyalkylene polyether polyol having an hydroxyl number of 200 meq polyol/g KOH or more;
   b) an aliphatic amine initiated polyoxyalkylene polyether polyol having an hydroxyl number of 200 meq polyol/g KOH or more;
   c) an aromatic polyester polyol having an hydroxyl number of 200 meq. polyol/g KOH or more, in an amount of 18.0 weight percent of less based on the weight of the polyol composition; and
   d) a blowing agent selected from the group consisting of cyclopentane, HFC's, HCFC's and mixtures thereof, present in an amount of at least about 5.0 weight percent based on the weight of the polyol composition.

2. The method of claim 1, wherein said a) and b) polyols together comprise polyols obtained by co-initiating said aromatic amine and said aliphatic amine with an alkylene oxide, and the polyol composition contains dissolved cyclopentane.

3. The method of claim 2, wherein said polyol composition further comprises an hydroxyl functional polyoxyalkylene polyether polyol having an average nominal functionality of at least 5.

4. The method of claim 3, wherein the average hydroxyl number of the polyols in the polyol composition is at least 350 meq polyol/g KOH.

5. The method of claim 4, wherein the mount of said a), b) and c) polyols is 50 weight percent or less based on the weight of all polyols in the polyol composition having a number average molecular weight of at least 200.

6. The method of claim 2, wherein each of said a) and b) polyols contain at least about 50 weight percent of polyoxypropylene groups based on the weight of all oxyalkylene groups.

7. The method of claim 2, wherein said polyol composition further comprises water in an amount of from about 0.05 to 4 weight percent.

8. The method of claim 1, wherein said polyol composition further comprises an hydroxyl functional polyoxyalkylene polyether polyol having an average nominal functionality of at least 5.

9. The method of claim 1, wherein the average hydroxyl number of all polyols having a number average molecular weight of at least 200 is at least 350 meq polyol/g KOH.

10. The method of claim 1, wherein the amount of said a) b) and c) polyols is 50 weight percent or less based on the weight of all polyols in the polyol composition having a number average molecular weight of at least 200.

11. The method of claim 1, wherein said a) and b) polyols contain at least about 50 weight percent of polyoxypropylene groups based on the weight of all oxyalkylene groups employed in the manufacture of said a) and b) polyols.

12. The method of claim 1, wherein said foam has an initial k-factor of 0.160 BTU-in./hr.-ft$^2$-F or less.

13. The method of claim 1, wherein said foam is dimensionally stable.

* * * * *